UNITED STATES PATENT OFFICE.

HUGH W. WALKER AND THOMAS L. PATTERSON, OF GREENOCK, SCOTLAND.

IMPROVEMENT IN PROCESSES OF CLARIFYING SACCHARINE JUICES.

Specification forming part of Letters Patent No. 195,190, dated September 11, 1877; application filed January 5, 1877.

*To all whom it may concern:*

Be it known that we, HUGH WILLIAM WALKER and THOMAS LAW PATTERSON, of Greenock, in the county of Renfrew, Scotland, have invented an Improvement in Clarifying Sirups, of which the following is a specification:

The object of our invention is to so treat the saccharine juices resulting from the manufacture or refining of sugar as to obtain therefrom bright clarified sirups ready for use; and this object we attain in the manner which we will now proceed to describe.

In the ordinary process of sugar-making the saccharine juices, after concentration, are usually left to cool in the tanks or pans, the time occupied in cooling down from boiling heat to atmospheric temperature being from three days in winter to five days in summer. The resulting sirups are always more or less turbid and of an objectionable dark color.

We have found that by rapidly cooling the saccharine juices by artificial means this turbidity and dark color of the liquid is entirely prevented, and a bright clarified sirup obtained.

In carrying out our invention the saccharine juices are first treated by any of the usual processes for rendering the final product uncrystallizable, and after having been neutralized by the addition of an alkaline carbonate, and then well stirred and filtered, the juices are next concentrated in the usual manner. When, however, the desired degree of concentration is reached the sirup is not cooled in the ordinary slow manner, by allowing it to stand in tanks or other vessels for from three to five days, subject only to ordinary atmospheric conditions, but it is cooled rapidly by artificial means, the time occupied in cooling being from three to six hours. For this purpose it is passed through apparatus made like any suitable kind of surface-condenser, the surface thereof being cooled by a current of cold water proceeding, by preference, in an opposite direction to the sirup.

The cooling-surface should contain about two hundred square feet for each inch of area of the discharge-cock, supposing the sirup to descend a depth of twenty or twenty-five feet, (at any part of which depth the cooling apparatus may be placed,) and to be filled into puncheons or other vessels, for storing or conveying it, by such discharge-cock at the bottom.

The cooling apparatus is, by preference, situated below a cistern, into which the sirup is transferred from the concentrating-pan, and with which cistern it is connected, so that the sirup may flow by gravitation through the cooling apparatus whenever the discharge-cock is opened; but where sufficient height for arranging the apparatus in that manner is not available, the sirup may be pumped or otherwise forced through the cooling apparatus at a rate due to a pressure of fifteen or sixteen pounds per square inch.

This rapid cooling of the sirup, as before stated, has the further advantage of preventing a darkening of color, which takes place when the sirup is cooled slowly.

We claim as our invention—

The within-described process of clarifying saccharine juices of sugar-manufacture—that is to say, by rapidly cooling the said juices by artificial means after concentration, substantially as described.

In testimony whereof we sign this our specification in presence of two subscribing witnesses.

HUGH WM. WALKER.
T. L. PATTERSON.

Witnesses:
EDMUND HUNT,
LOCK MOORE.